United States Patent
Nguyen et al.

(10) Patent No.: US 10,804,735 B2
(45) Date of Patent: Oct. 13, 2020

(54) UNINTERRUPTIBLE POWER SUPPLY

(71) Applicant: HEWLETT PACKARD ENTERPRISE DEVELOPMENT LP, Houston, TX (US)

(72) Inventors: Hai Ngoc Nguyen, Houston, TX (US); Daniel Hsieh, Taipei (CN); Abhishek Banerjee, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 61 days.

(21) Appl. No.: 16/074,068

(22) PCT Filed: Jan. 29, 2016

(86) PCT No.: PCT/US2016/015572
§ 371 (c)(1),
(2) Date: Jul. 30, 2018

(87) PCT Pub. No.: WO2017/131731
PCT Pub. Date: Aug. 3, 2017

(65) Prior Publication Data
US 2019/0044373 A1 Feb. 7, 2019

(51) Int. Cl.
*H02J 9/06* (2006.01)
(52) U.S. Cl.
CPC .............. *H02J 9/061* (2013.01); *H02J 9/062* (2013.01)
(58) Field of Classification Search
CPC .................................. H02J 9/061; H02J 9/062
See application file for complete search history.

(56) References Cited

U.S. PATENT DOCUMENTS

| 5,388,031 A | 2/1995 | Satoh |
| 6,356,470 B1 | 3/2002 | Sadler et al. |
| 6,951,478 B2 | 10/2005 | Cheng |
| 2003/0197428 A1* | 10/2003 | Hatton .................... H02J 9/062 307/82 |
| 2006/0146581 A1* | 7/2006 | Murphy ............... H05K 7/1492 363/37 |

(Continued)

FOREIGN PATENT DOCUMENTS

JP H0638538 A 2/1994

OTHER PUBLICATIONS

International Search Report and Written Opinion, International Application No. PCT/US2016/015572, dated Oct. 12, 2016, pp. 1-8, KIPO.

(Continued)

*Primary Examiner* — Rexford N Barnie
*Assistant Examiner* — Thai H Tran

(57) ABSTRACT

Techniques for providing an uninterruptible power supply are disclosed. An example system includes three single-phase Uninterruptible Power Supplies (UPSs) and an adapter. The adapter is to receive three-phase AC power, and separate the three-phase AC power into three separate single-phase outputs. Each single-phase output is coupled to an input of one of the three single-phase UPSs. An output of each one of the single-phase UPSs is coupled to one of three single-phase inputs of the adapter, and the adapter is to combine the three single-phase inputs into a single three-phase output.

9 Claims, 3 Drawing Sheets

(56) References Cited

U.S. PATENT DOCUMENTS

| | | | |
|---|---|---|---|
| 2009/0039706 A1* | 2/2009 | Kotlyar | H02J 9/062 |
| | | | 307/64 |
| 2010/0013311 A1 | 1/2010 | Groff et al. | |
| 2012/0235480 A1* | 9/2012 | Kim | H02J 9/062 |
| | | | 307/18 |
| 2013/0214604 A1 | 8/2013 | Johnson, Jr. | |
| 2015/0022003 A1 | 1/2015 | Dighrasker et al. | |
| 2016/0226391 A1* | 8/2016 | Wacknov | G05B 19/042 |

OTHER PUBLICATIONS nntp.ext.ray.com, "How Convert Three-phase Power to Single-phase?," Electronics Point, Aug. 6, 2004, pp. 1-12 (online), Retrieved from the Internet on Dec. 31, 2015 at URL: <electronicspoint.com/threads/how-convert-three-phase-power-to-single-phase.16326/.

* cited by examiner

UNINTERRUPTIBLE POWER SUPPLY

BACKGROUND

An uninterruptible power supply (UPS) is power source that stores electrical power for use in the event that the main power source fails. UPSs are often used in computer systems to protect against failure or data loss due to power interruptions. For example, UPSs are often used to protect systems such as personal computers and data centers.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

The present specification discloses an uninterruptible power supply system that uses individual single-phase UPS modules. UPSs are used in a wide variety of applications. For example, many computer systems use single-phase power, while many other computer systems use three-phase power. Accordingly, UPSs are usually specifically tailored to provide either three-phase power or single-phase power, and UPS manufacturers will usually have different product offerings for single-phase power or three-phase power.

The present techniques enable the use of three single-phase UPSs to provide the functionality of a single three-phase UPS. Each single-phase UPS can be re-used and re-configured to provide power for a single-phase computer system. The present techniques provide more versatility in UPS systems and enable a manufacturer is to simplify the product offering by eliminating those UPSs specifically tailored for only three-phase operation.

Figure 1:
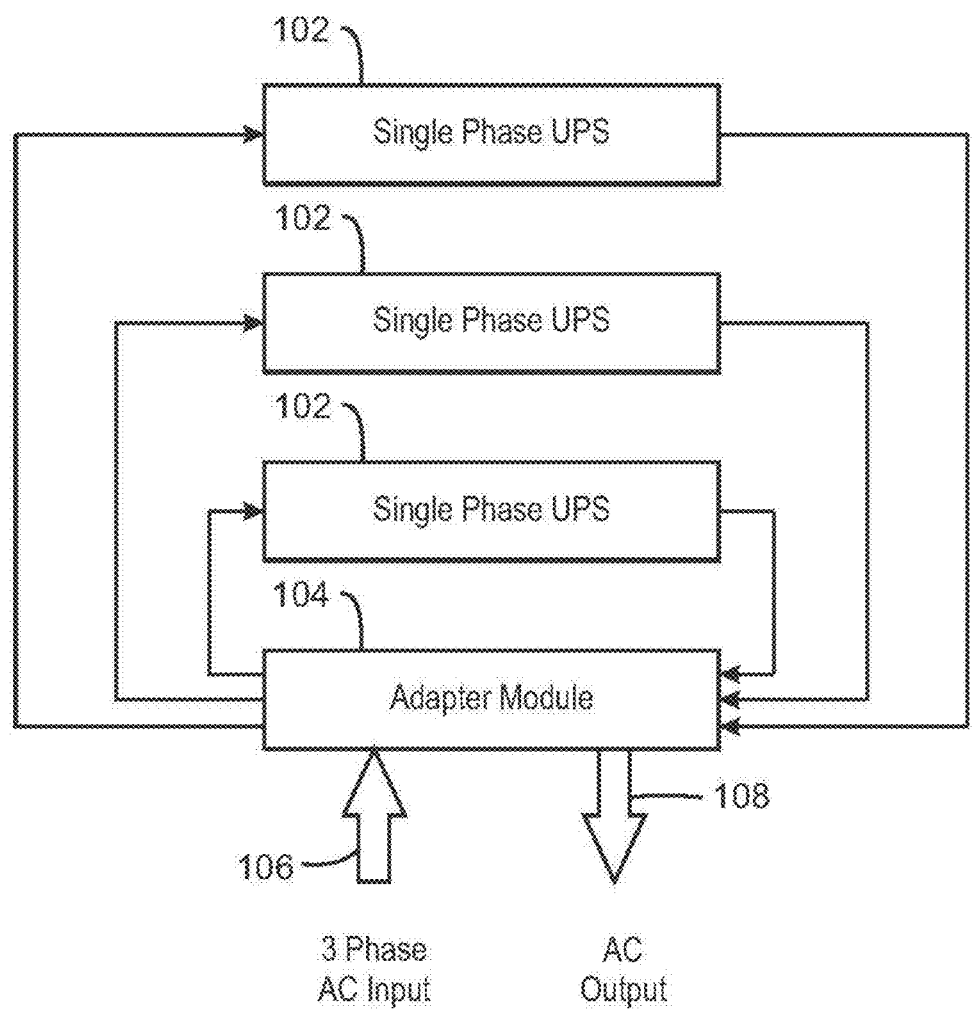
FIG. 1 is a block diagram of a system for providing uninterruptible Alternating Current (AC) power.

FIG. 1 is a block diagram of a system for providing uninterruptible Alternating Current (AC) power. It will be appreciated that the system 100 shown in FIG. 1 is only one example of a system for providing uninterruptible AC power. The example system includes three single-phase UPSs 102 and an adapter module 104. The single-phase UPSs 102 each include a battery to store electrical energy to be used as a backup power source in the event that the AC input power source fails. Each single-phase UPS 102 may be a separate self-contained UPS with its own housing and sockets for receiving single-phase AC power plugs.

The adapter module 104 is configured to receive three-phase AC input power from an AC power source, such as from a wall outlet often referred to as mains power. The adapter module 104 splits the three-phase input power into three separate single-phase outputs. Each single-phase output is fed to one of the single-phase UPSs 102. The outputs of each single-phase UPS is fed back to single-phase inputs of the adapter module 104. The adapter module 104 can recombine the three single-phase inputs to provide an output that can be used to power one or more computing devices through suitable power cables.

In some examples, the adapter module 104 is configured to recombine the three single-phase inputs to provide a single three-phase output. In some examples, the adapter module 104 can be configured to provide three separate single-phase AC outputs. The adapter module 104 can also be configured to enable a user to select whether the adapter module 104 provides a single three-phase output or three separate single-phase outputs. In some examples, the adapter module 104 detects the type of device coupled to the AC output 108 and automatically selects whether the adapter module 104 provides a single three-phase output or three separate single-phase outputs.

As mentioned above, each single-phase UPS is a separate self-contained unit. Accordingly, each single-phase UPS is usable as a stand-alone unit. In that case, the input of the single-phase UPS can be coupled to mains power through a standard power cable and the output of the single-phase UPS can be coupled to a computing device through a standard power cable.

The adapter module 104 enables the use of the single-phase UPSs to provide the functionality of a three-phase UPS. In the event that one of the single-phase UPSs becomes inoperable, the inoperable UPS can be easily replaced. Furthermore, each of the single-phase UPSs can be easily removed from the system 100 and re-used for a different application.

Figure 2:
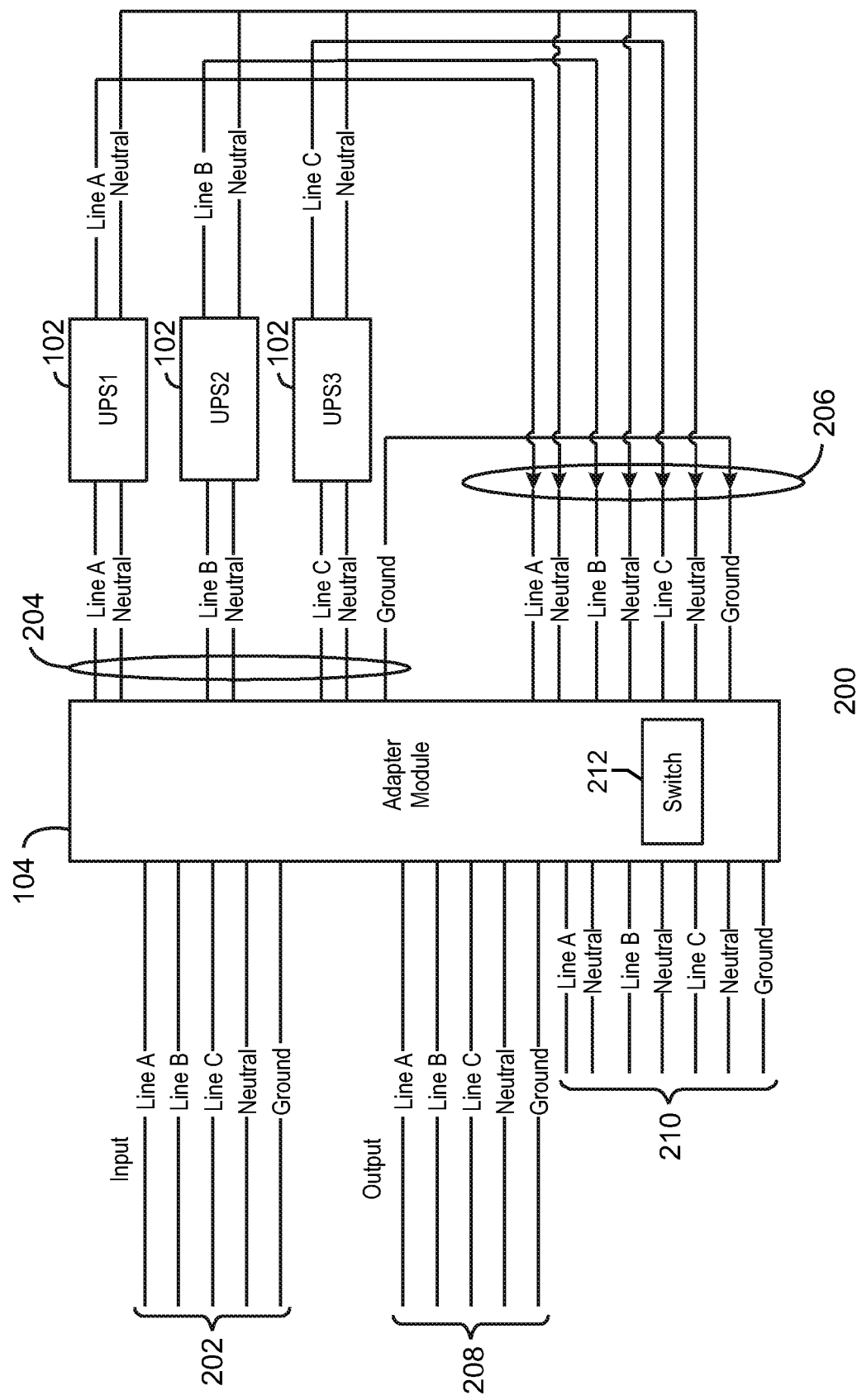
FIG. 2 is a more detailed example of a system for providing uninterruptible AC power.

FIG. 2 is a more detailed example of a system for providing uninterruptible AC power. As in FIG. 1, the example system includes three single-phase UPSs 102 and an adapter module 104. The input 202 of the adapter module 104 is a three-phase AC input power, which includes Line A, Line B, Line C, Neutral, and Ground. It will be appreciated that three-phase power may be delivered using different wiring configurations and that the techniques described herein are not limited to the particular wiring configuration shown in FIG. 2.

The adapter module 104 splits the three-phase input power into three separate single-phase outputs 204, each one of which is fed to one of the single-phase UPSs 102. In the example of FIG. 2, line A is fed to UPS 1, line B is fed to UPS 2, and line C is fed to UPS 3. The neutral line is split into three separate output lines and also fed to the inputs of the UPSs 102.

The output of each single-phase UPS 102 is fed back to three single-phase inputs 206 of the adapter module 104. Furthermore, the ground line is fed back from the adapter module output directly to the adapter module input. The ground line may be wired internally within the adapter module housing.

Each UPS 102 may be a separate unit with its own housing and standard power outlets. The adapter module 104 may also be its own separate unit with its own housing and standard power outlets. Accordingly, the couplings shown in FIG. 2, may be accomplished through the use of standard power cables. In some examples, the UPS modules 102 and the adapter module 104 use specialized power outlets that use special, i.e., non-standard cables.

The output of the adapter module 104 can include a single three-phase output 208 and three single-phase outputs 210. The outputs 208 or 210 may be active depending on the type of computing device or devices to be powered. For the single three-phase output, the three single-phase adapter inputs 206 are recombined. For the three single-phase outputs, the three single-phase inputs are passed through to the output without being recombined.

The adapter module 104 includes a switching mechanism 212 that can switch the power alternatively to the three-phase output 208 or the single-phase outputs 210. The switching mechanism 212 can be physically manipulated by a user. For example, the switching mechanism 212 may include a manually actuated switch disposed on the outer housing of the adapter module 104.

In some examples, the switching mechanism 212 is actuated automatically. For example, the switching mechanism 212 may detect which output has a device coupled to it and automatically switch power that output.

Figure 3:
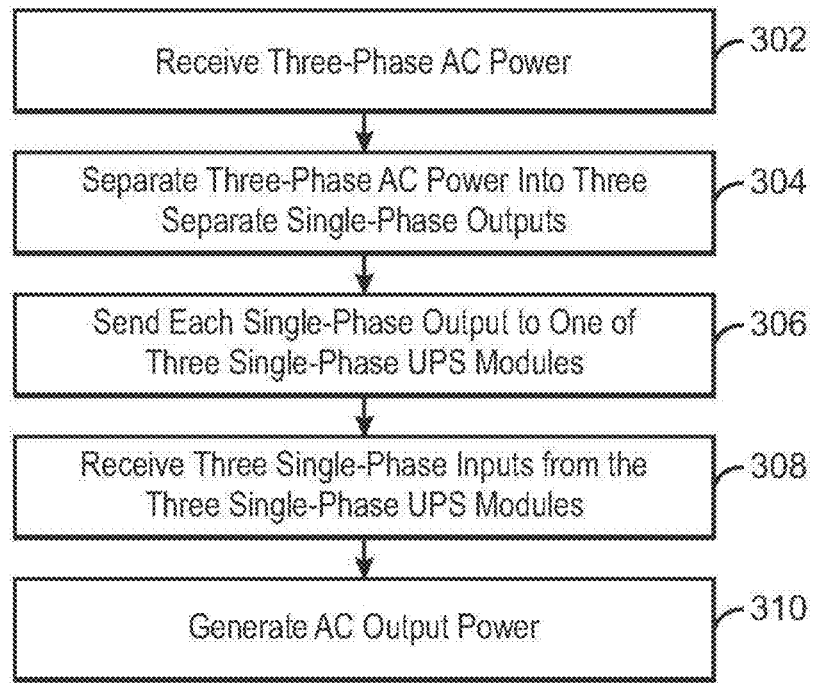
FIG. 3 is an example process flow diagram of a method of providing uninterruptible AC power.

FIG. 3 is an example process flow diagram of a method of providing uninterruptible AC power. The method 300 can be performed by the example adapter module 104 shown in FIGS. 1 and 2.

At block 302, three-phase AC power is received.

At block 304, the three-phase AC power is separated into three single-phase outputs.

At block 306, each single-phase output is coupled to one of three single-phase UPSs. The coupling may be achieved through detachable power cables, which may be standard power cables.

At block 308, three single-phase inputs are received from the outputs of the three single-phase UPSs. Again, the coupling may be achieved through detachable power cables, which may be standard power cables.

At block 310, AC output power is generated. The AC output power may be generated by combining the three single-phase inputs into a single three-phase output. The AC output power may also be generated by passing each of the single-phase inputs received from the single-phase UPSs through to three separate single-phase outputs of the adapter module. In some examples, the adapter module may be capable of generating a single three-phase output or three single-phase outputs depending on user selection or automatic detection of which outputs are in use.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A system comprising:
   three single-phase Uninterruptible Power Supplies (UPSs), each UPS comprising:
      an input line; and
      an output line; and
   an adapter comprising:
      a three-phase input line to receive three-phase AC power;
      three single-phase power lines into which the three-phase AC power is separated, each single-phase power line coupled to the input line of a different one of the three single-phase UPSs;
      three single-phase input lines, each single-phase input line coupled to the output line of a different one of the three single-phase UPSs;
      a three-phase output line to combine three single-phase inputs, from the output lines of the three single-phase UPSs, into a single three-phase output;
      three single-phase output lines, additional to the three-phase output line, to provide the three single-phase inputs as three separate single-phase outputs; and
      a switch that connects to the three-phase output line or connects to the three additional single-phase output lines based on the adapter detecting whether the three-phase output line or the three additional single-phase output lines is in use.

2. The system of claim 1, wherein each single-phase UPS is a self-contained unit with its own housing.

3. The system of claim 1, wherein the adapter and the three single-phase UPSs are coupled by standard power cables.

4. An adapter module comprising:
   a three-phase input line to receive three-phase AC power;
   three single-phase power lines into which the three-phase AC power is separated, each single-phase power line to couple to an input line of one of three single-phase Uninterruptible Power Supplies (UPSs);
   three single-phase input lines, each single-phase input line to couple to an output line of one of the three single-phase UPSs to receive one of three single-phase inputs;
   a three-phase output line to provide a three-phase output using the three single-phase inputs;
   three single-phase output lines, additional to the three-phase output line, to provide three separate single-phase outputs using the three single-phase inputs; and
   a switch that connects to the three-phase output line or connects to the three additional single-phase output lines based on the adapter module detecting whether the three-phase output line or the three additional single-phase output lines is in use.

5. The adapter module of claim 4, wherein the adapter module is a self-contained unit with its own housing.

6. The adapter module of claim 4, wherein the adapter module includes standard power sockets to couple to the three single-phase UPSs.

7. A method comprising:
   receiving three-phase AC power;
   separating the three-phase AC power into three separate single-phase outputs;
   providing each single-phase output to one of three single-phase Uninterruptible Power Supplies (UPSs);
   receiving three single-phase inputs from the three single-phase UPSs;
   detecting, by an adapter module, whether a three-phase output line or three additional single-phase output lines is in use;
   setting, by the adaptor module based on the detecting, a switch to connect to the three-phase output line or to connect to the three additional single-phase output lines; and
   providing an output using the three single-phase inputs, wherein providing the output comprises:
      combining the three single-phase inputs into a single three-phase output when the switch is set to the three-phase output line; or
      passing the three single-phase inputs when the switch is set to the three additional single-phase output lines.

8. The method of claim 7, wherein the method is performed by an adapter module that is a self-contained unit with its own housing separate from each of the three single-phase UPSs.

9. The method of claim 7, wherein each single-phase output is provided to one of three single-phase UPS modules through standard power cables.

* * * * *